US006389954B1

(12) United States Patent
Constantinides et al.

(10) Patent No.: US 6,389,954 B1
(45) Date of Patent: May 21, 2002

(54) REMOVABLE FILTER PLUG FOR SPRING BRAKE ACTUATOR

(75) Inventors: Savvas K. Constantinides, Fresno; Ted D Smith, S. Fresno, both of CA (US)

(73) Assignee: TSE Brakes, Inc., Fresno, CA (US)

( * ) Notice: Subject to any disclaimer, the term of this patent is extended or adjusted under 35 U.S.C. 154(b) by 0 days.

(21) Appl. No.: 09/444,218

(22) Filed: Nov. 19, 1999

(51) Int. Cl.[7] .......................... F01B 31/00; F15B 21/04; F16J 10/02

(52) U.S. Cl. .......................................... 92/78; 92/130 R

(58) Field of Search ................................ 92/78, 130 R, 92/230 A, 98 R

(56) References Cited

U.S. PATENT DOCUMENTS

| | | | |
|---|---|---|---|
| 3,183,795 | A | 5/1965 | Kirk |
| 3,291,004 | A | 12/1966 | Stevenson et al. |
| 3,302,530 | A | 2/1967 | Dobrikin et al. |
| 3,495,503 | A | 2/1970 | Gummer et al. |
| 3,508,469 | A | 4/1970 | Williams |
| 3,613,515 | A | 10/1971 | Swander et al. |
| 3,710,692 | A | 1/1973 | Valentine |
| 3,712,181 | A | 1/1973 | Swander, Jr. et al. |
| 3,730,056 | A | 5/1973 | Swander |
| 3,789,737 | A | 2/1974 | Burnett |
| 3,800,668 | A | 4/1974 | Valentine |
| 3,811,365 | A | 5/1974 | Gordon et al. |
| 3,842,716 | A | 10/1974 | Swander |
| 3,977,308 | A | 8/1976 | Swander et al. |

(List continued on next page.)

FOREIGN PATENT DOCUMENTS

| | | |
|---|---|---|
| DE | 3241548 A1 | 5/1984 |
| DE | 4349972 A2 | 5/1984 |
| EP | 0 098 029 | 1/1984 |
| FR | 2.208.484 | 6/1974 |
| FR | 2.279.977 | 7/1975 |
| FR | 2.384.164 | 3/1978 |
| FR | 2.521.651 | 2/1983 |
| JP | 47-9644 | 3/1972 |
| JP | 49-127328 | 12/1974 |
| JP | 52-185 | 1/1977 |
| JP | 57-179565 | 11/1982 |
| JP | 58-97550 | 6/1983 |
| JP | 58-187634 | 12/1983 |
| JP | 60-30868 | 3/1985 |
| JP | 63-53159 | 3/1988 |
| JP | 3-75069 | 7/1991 |
| JP | 7-31541 | 6/1995 |
| JP | 7-291117 | 11/1995 |

OTHER PUBLICATIONS

MGM Model E–TS Series Sever–Service Spring Brakes brochure no date available.

Anchorlok/Life Seal "A Unique GORE–TEX Filter Protects our Spring Brake" brochure—no date available.

Anchorlok/Life Seal "Six Year No Hassle Guarantee" brochure no date available.

*Primary Examiner*—John E. Ryznic
(74) *Attorney, Agent, or Firm*—Mark D. Miller

(57) ABSTRACT

Disclosed is an easily removable and replaceable filter for attachment to the breather holes in the housing of a spring or service brake actuator. The invention has a hollow shaft and flange for snap fitment into a brake actuator breather hole, and includes a plurality of ventilation openings and a membrane made of material which allows air to pass into and out of the spring brake housing, while keeping foreign material out. The present invention may be easily adapted for use on any of a large number of existing spring or service brake housing assemblies (including piston, diaphragm, dual-diaphragm, dual-piston, and/or piston & diaphragm) at minimal cost. When the filter(s) of the present invention are installed, any unused breather openings in the spring brake housing should be plugged so that all air is filtered through the membrane in the filter.

7 Claims, 6 Drawing Sheets

U.S. PATENT DOCUMENTS 4,093,038 A 6/1978 Molin
4,109,464 A * 8/1978 Wickland .................. 92/78 X
4,116,114 A 9/1978 Swander et al.
4,508,018 A 4/1985 Choinski
4,860,640 A 8/1989 Ware
4,889,037 A 12/1989 Goral et al.
4,890,540 A * 1/1990 Mullins ......................... 92/63
4,945,818 A 8/1990 Ware
5,002,164 A 3/1991 Bowyer
5,016,523 A 5/1991 Bowyer
5,116,650 A 5/1992 Bowser
5,320,026 A 6/1994 Pierce
5,345,858 A 9/1994 Pierce
5,372,059 A * 12/1994 Pierce et al. ................... 92/48
5,460,076 A * 10/1995 Pierce et al. ................... 92/48
5,640,893 A 6/1997 Stojic
5,655,431 A 8/1997 Pierce
5,671,654 A 9/1997 Plantan
5,713,238 A 2/1998 Pierce
5,722,311 A 3/1998 Pierce
5,725,076 A 3/1998 Pierce
5,771,774 A 6/1998 Stojic
5,836,233 A 11/1998 Rumsey
5,873,297 A 2/1999 Stojic
5,937,733 A 8/1999 Stojic
6,006,651 A * 12/1999 Pierce et al. ................... 93/63

* cited by examiner

REMOVABLE FILTER PLUG FOR SPRING BRAKE ACTUATOR

BACKGROUND OF THE INVENTION

1. Field of the Invention

The present invention relates to spring brake systems for heavy duty vehicles, and in particular to a removable, breathable filter plug for attachment to the service brake housing or emergency brake housing of a spring brake actuator which prevents moisture and unwanted contaminants from entering the actuator, while allowing air to pass into and out of the housing during normal use.

2. Description of the Prior Art

Spring brake actuators are widely used in the trucking industry to control the brakes of heavy-duty vehicles and their trailers. There are two basic types of spring brake actuators, service brake actuators, and emergency brake actuators. These actuators can be deployed as separate assemblies, or combined into a single dual assembly including both a service brake and an emergency brake actuator. A service brake actuator is operator controlled and is used for slowing or stopping a moving vehicle. An emergency or parking brake actuator is typically held off with air pressure while the vehicle is in use, but automatically engages (thereby applying the brakes) when air pressure is removed, such as when the vehicle is turned off or if there is a failure in the vehicle air system.

A typical service brake actuator is characterized by a closed housing which contains a movable diaphragm stretched across the inside. One side of the diaphragm moves a slidable push rod which extends out of the housing for attachment to the brakes of the vehicle. On the other side of the diaphragm a sealed chamber is formed within the housing. An opening is provided in this chamber for connection to a pneumatic (air) pressure source usually provided by an air compressor on board the vehicle. The brakes of the vehicle can be applied by introducing sufficient pneumatic pressure into the sealed chamber to act against the service brake diaphragm which moves the push rod out. A small return spring is ordinarily provided inside the service brake housing around the push rod to urge it to retract when the air pressure behind the diaphragm is reduced.

While the vehicle is operating, air pressure is being constantly applied to and removed from the sealed chamber in the upper portion of the service brake housing to operate the brakes of the vehicle. The application and removal of air pressure causes the diaphragm inside the housing to move back and forth, moving the push rod in and out. In order for the diaphragm to be able to expand, the air in the lower portion of the service brake housing must be allowed to escape to the outside. Then, in order for the diaphragm to contract, air must be allowed to enter this area.

Typical service brake housing assemblies include a plurality of air holes in the lower housing to allow air to enter and exit this region as the diaphragm moves back and forth. The unfortunate effect of this action is to allow dirt, water, oil, debris, and other unwanted materials to enter the service brake housing from the outside through the air holes.

A typical emergency brake actuator is attached in axial alignment with or made a part of the service brake assembly. The emergency brake is a separate closed housing which contains a heavy main compression spring and a second movable diaphragm creating a second sealed chamber. The emergency brake diaphragm is also attached to or directly associated with the slidable central push rod of the service brake. The second sealed chamber is formed inside the emergency brake housing on one side of the diaphragm, and the heavy main compression spring is deployed on the opposite side. As with the service brake, the sealed chamber of the emergency brake is connected to the on-board pneumatic source of the vehicle. As long as sufficient air pressure is provided to the sealed chamber, the diaphragm in the emergency brake will remain fully expanded thereby compressing (caging) the main spring. However, should air pressure fall, or should there be a leak in the sealed chamber, the diaphragm will be unable to hold the main compression spring in place. When this occurs, either slowly or quickly, the main compression spring will expand causing the push rod to be extended out thereby applying the brakes of the vehicle.

Under normal conditions, when the vehicle is parked, the air pressure to the emergency brake is removed causing the main compression spring to apply the brakes. As the emergency brake is engaged and disengaged, air pressure is introduced and removed from the sealed chamber in the lower portion of the emergency brake housing, causing the diaphragm inside the housing to move back and forth. In order for the diaphragm to expand and compress the main spring, the air in the upper portion of the housing around the spring must be allowed to escape to the outside. Then, in order for the diaphragm to contract and release the main spring, air must be allowed to enter the area of the upper housing around the spring.

Typical emergency brake housing assemblies also include a plurality of air holes in the upper housing in the vicinity of the main spring to allow air to enter and exit this region as the diaphragm moves back and forth. The unfortunate effect of this action is the same as in the service brake housing, allowing dirt, water, oil, debris, and other unwanted materials to enter the emergency brake housing from the outside through the air holes.

Several inadequate or cumbersome solutions have been advanced to respond to this problem. The inventions of U.S. Pat. Nos. 4,508,018 and 5,671,654 describe a sealed internal breathing system which utilizes a tubular structure connecting between the service brake housing and the emergency brake housing. Air is transmitted between the two sealed housings through the tubular structure, so that no outside air is ever needed. However, the use of such a tube requires specially designed housings for both the spring brake and emergency brake making it difficult and costly to manufacture.

The invention of U.S. Pat. No. 5,320,026 employs a rubber dust guard in the upper housing between the power spring and the housing wall to prevent particulate matter from passing beyond the spring into the actuator tube where it might affect the sliding rod. However, this invention does not prevent foreign matter from entering the upper chamber in the first place through the air openings. Thus, foreign material can collect around the power spring potentially affecting operation of the brake.

The inventions of U.S. Pat. Nos. 5,372,059 and 5,722,311 use a pair of valves: a first one-way valve allows air to enter the area around the main spring only from the sealed chamber in the spring brake housing; another other one-way valve only allows air to escape from this area to the outside. A similar approach is taught in U.S. Pat. No. 5,873,297 which employs a double check valve in the housing, and a separate valve in the upper housing diaphragm for communication between the sealed chamber and the area around the main spring. Each of these inventions requires cumbersome specially designed emergency brake housing structures including at least one opening(s) in the spring brake diaphragm, together with the use of no less than two separate valves, leaving such systems vulnerable to several different kinds of failures which could be costly and difficult to repair.

The invention of U.S. Pat. No. 5,836,233 describes a spring brake actuator which employs breather holes located on the cylindrical side walls of the upper housing such that when the main spring is compressed or caged, the diaphragm covers the holes. However, when uncaged, these unfiltered breather holes are exposed to the atmosphere, allowing foreign material to enter the housing. A check valve is also provided in a cap attached to the upper housing.

The invention of U.S. Pat. No. 5,937,733 describes a spring brake actuator having a filter integrated into the emergency brake housing. A series of vent openings, valves, seals and internal conduits allow air to escape from both the service and emergency brake housings through this filter. Another similar device utilizes a hydrophobic filter system using a Gore-Tex membrane which is integrated into the top of the emergency brake housing to prevent water and contaminants from entering the housing while allowing air to flow in and out. However, because this filter system is integrated into a caging device (used to manually compress the main spring) it is impossible to remove or change the filter should it become clogged. The integral caging device is bulky and requires more space under the vehicle than a brake without such a device, thereby making such a brake assembly unusable on vehicles with restricted available space. In addition, although a relatively large filter is used, only a small area of the filter itself is ever utilized.

SUMMARY OF THE INVENTION

The present invention overcomes the drawbacks of the prior art while still enjoying the benefits of a breathable housing for a spring or service brake actuator by providing an easily removable and replaceable filter unit or plug for attachment to at least one of the breather holes of a spring or service brake assembly housing. Any remaining breather holes which are not used to receive a filter unit of the present invention are closed with plugs or seals, so that any air passing into or out of the breather holes passes must do so through filter units of the present invention. The filter unit of the present invention may be employed in the breather holes of the service brake housing, the emergency brake housing, or both. The present invention may be used in single diaphragm, single piston, piston & diaphragm, or dual diaphragm brake actuators. The filter unit includes a membrane through which air is allowed to pass into and out of the spring or service brake housing during normal use. The membrane itself is made of a material which prevents outside contaminants such as oil, water and debris from entering the housing. The membrane may be made of oilophobic and/or hydrophobic material.

The filter of the present invention may be easily inserted into any of the breather holes of either the service brake or emergency brake housing, the remaining holes being plugged closed. The filter may be installed in as few as one, or as many as all of the breather holes, depending on the desired availability of filtered air. The filter unit of the present invention has a very low (flattened) profile so that it takes up a minimal amount of space on the outside of the spring or service brake housing. It is made in a variety of different sizes and shapes to accommodate different sizes of breather holes and the housings of different brake actuators. The preferred embodiment of the present invention may be easily removed and replaced. As a result, the present invention may be used on any of a large number of existing spring or service brake housing assemblies at minimal cost, thereby avoiding the need for such costly, cumbersome and unnecessary structures as valves, tubes, conduits, perforated diaphragms and/or integrated caging apparatus in the brake actuator.

Several alternative designs for the filter plug of the present invention are available. In the preferred design, the unit includes a small outwardly protruding hollow shaft (made of ABS or some other durable material such as plastic, rubber or metal) having an annular flange at the end thereof which snaps into a breather hole of the brake housing assembly. The hollow shaft is attached to a low-profile structure which supports the filter. This structure includes a support base having an open central area that is in communication with the hollow interior of the shaft, a membrane stretched across the central area for filtering out foreign material, and a cover having a large open area above the membrane with ventilation holes to the exterior.

Alternative designs for the present invention include: (a) the filter being integrated into the plug as a single unit; (b) the filter being screwed over external threads in the support structure; or (c) the filter being screwed into internal threads in the support structure. In another alternative design, the annular flange at the end of the shaft is removed and replaced with helical threads for threadable insertion into a breather hole of a brake actuator housing. In another alternative design, the hollow shaft is eliminated, and the support base of the invention is provided with a wide opening directly to the exterior. This opening is glued, sealed or otherwise adhered or attached directly over a breather hole of the brake actuator housing.

It is therefore a primary object of the present invention to provide a removable breathable filter unit for attachment to at least one of the breather holes of a spring or service brake actuator which prevents foreign material from being introduced into the actuator from the outside.

It is also a primary object of the present invention to provide a removable breathable filter unit that may be attached to at least one of the breather holes of the service brake housing of a spring brake actuator.

It is also a primary object of the present invention to provide a removable breathable filter unit that may be attached to at least one of the breather holes of the emergency brake housing of a spring brake actuator.

It is a further important object of the present invention to provide a low cost removable breathable filter unit for attachment to the breather holes of any of a number of spring or service brake actuator designs without any modification to the actuators themselves.

It is a further object of the present invention to provide a breathable filter unit for attachment to the upper housing of an emergency spring brake actuator in conjunction with sealing plugs that are inserted into the remaining breather holes of the housing.

It is a further object of the present invention to provide a breathable filter unit for attachment to the lower housing of an service brake actuator in conjunction with sealing plugs that are inserted into the remaining breather holes of the housing.

It is another object of the present invention to provide a breathable filter unit for sealing attachment over one or more of the breather holes of a spring or service brake actuator housing.

It is another object of the present invention to provide a breathable filter unit for sealing attachment over one or more of the breather holes of either a single diaphragm, single piston, piston & diaphragm, dual piston or dual diaphragm spring or service brake actuator housing.

It is another object of the present invention to provide a spring or service brake housing having a lesser number of larger breather holes for use exclusively in conjunction with filter units of the present invention.

Additional objects of the invention will be apparent from the detailed descriptions and the claims herein.

DETAILED DESCRIPTION OF THE PREFERRED EMBODIMENTS

Figure 3:
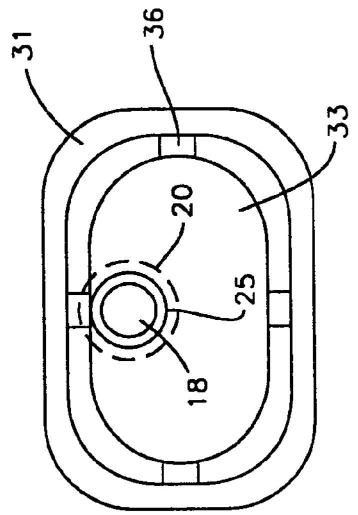
FIG. 3 is a top plan view of the embodiment shown in FIG. 1.
Figure 2:
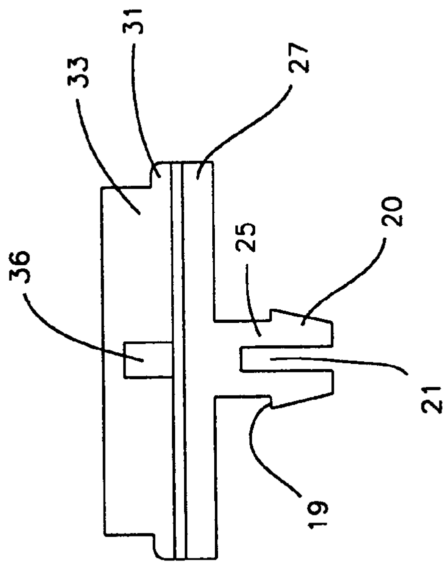
FIG. 2 is an end view of the embodiment shown in FIG. 1.
Figure 1:
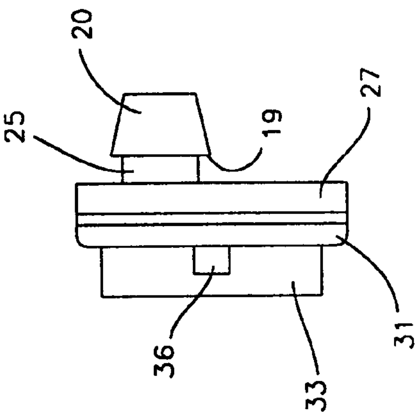
FIG. 1 is a side view of a first embodiment of the present invention.
Figure 4:
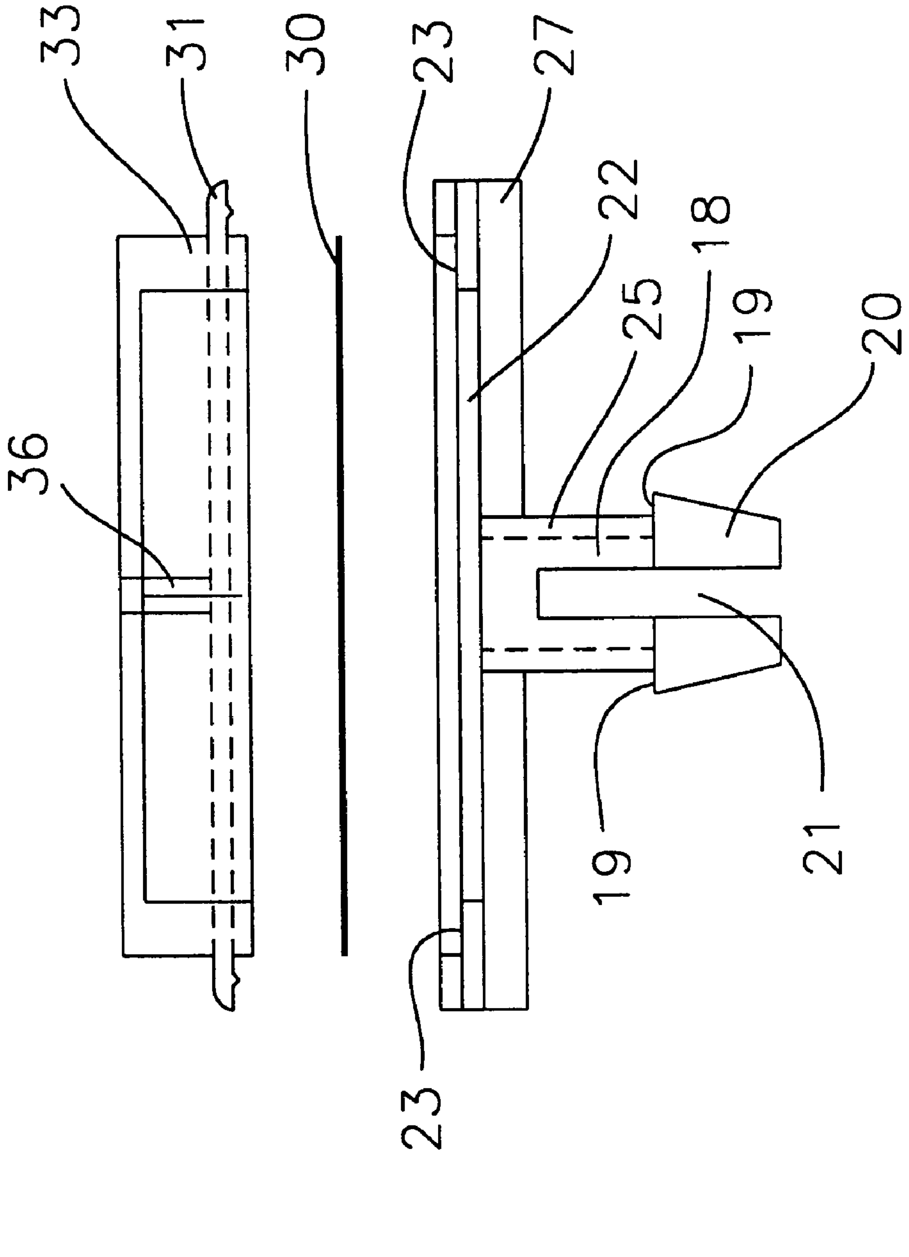
FIG. 4 is a n exploded end view of the embodiment shown in FIG. 1.
Figure 5:
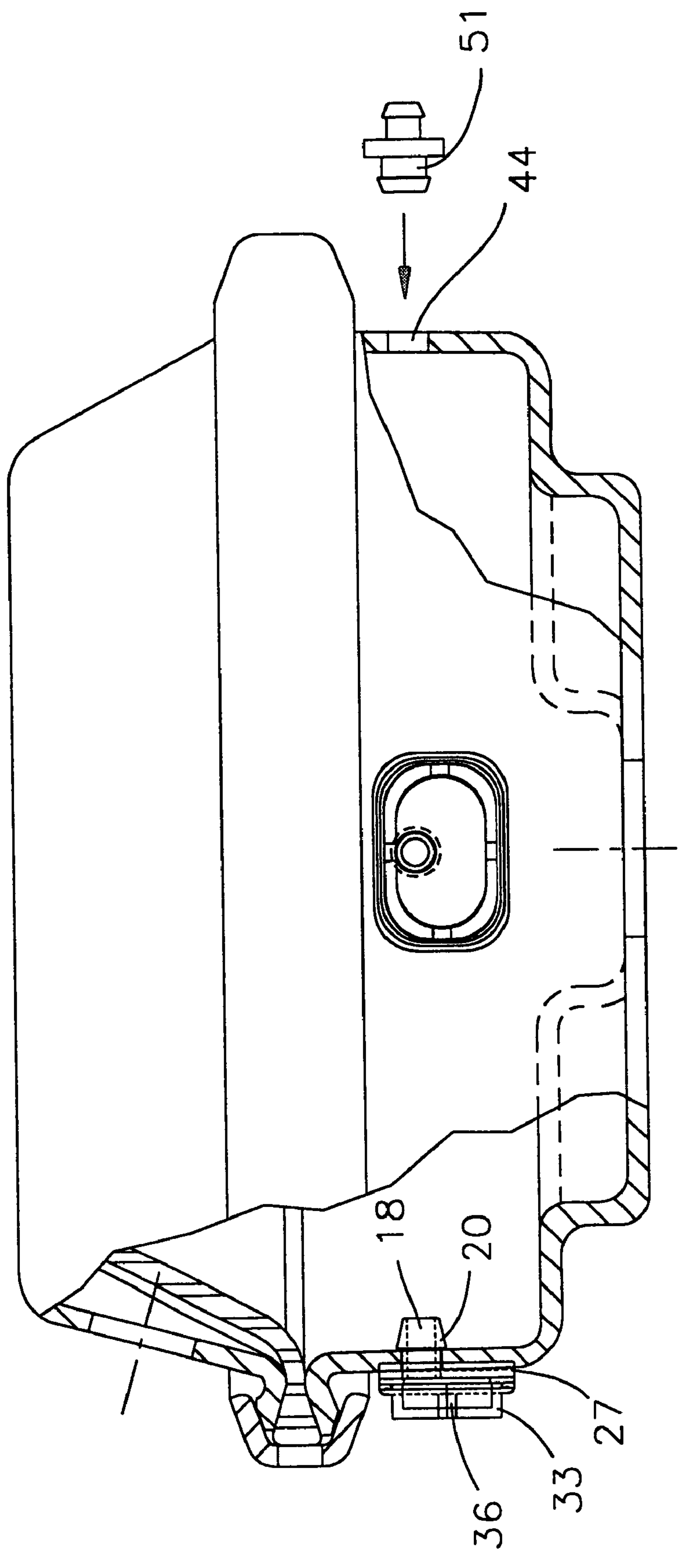
FIG. 5 is an environmental view of the invention shown installed on a service brake housing.
Figure 6:
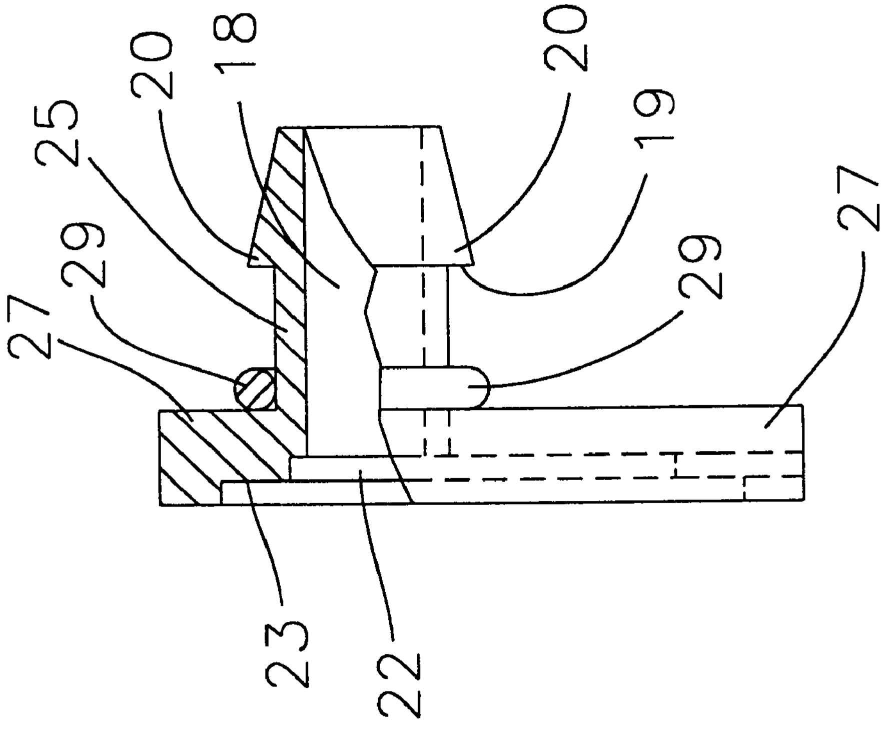
FIG. 6 is a partially cut-away side view of the support base of the invention.
Figure 8:
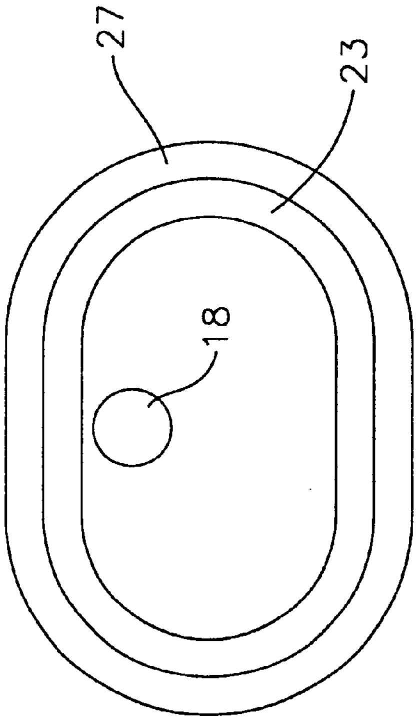
FIG. 8 is a top plan view of the support base of the invention without membrane.
Figure 7:
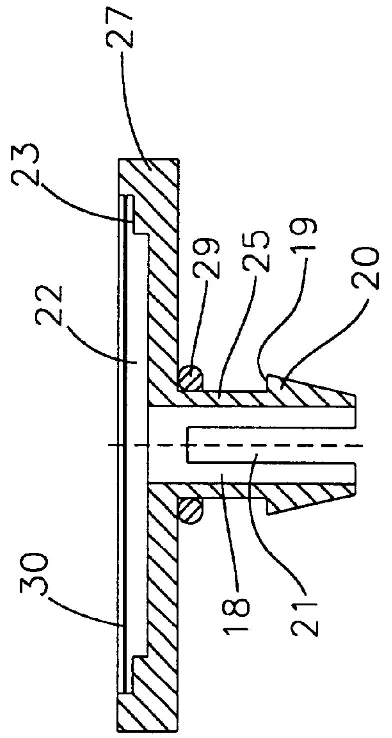
FIG. 7 is a cross-sectional end view of the support base of the invention with membrane.
Figure 9:
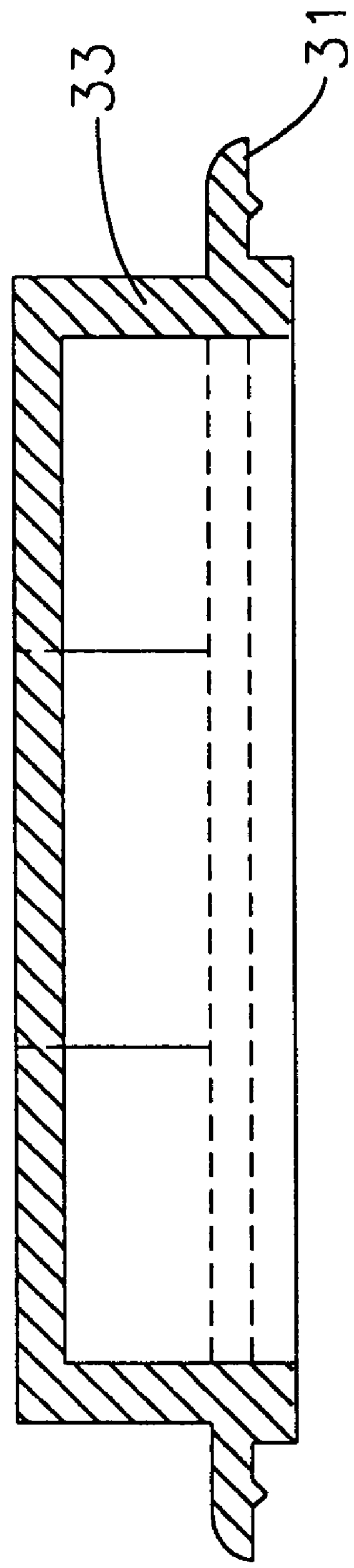
FIG. 9 is a cross sectional side view of the filter top shown in FIG. 4.

Referring to the drawings wherein like reference characters designate like or corresponding parts throughout the several views, and referring particularly to FIG. 7 it is seen that the invention includes a support base 27 having a hollow shaft 25 attached thereto. Shaft 25 is made of durable plastic or other material and has a central opening 18 therein. The lower distal portion of shaft 25 is bisected into two halves by slotted opening 21, and includes a lower annular locking flange 20 that is also bisected by slot 21 as shown in FIGS. 2, 4 and 7. Bisected flange 20 is tapered so that it is narrowest at the distal end of shaft 25, and wider towards the proximal end forming shoulders 19. The distal end of shaft 25 supporting bisected flange 20 is designed for easy insertion into a breather hole 44 of a spring brake actuator as depicted in FIG. 5. Slot 21 allows bisected flange 20 to bend inward allowing this flange and shaft 25 to pass into breather hole 44. When the wide shoulder 19 of flange 20 passes through breather hole 44, it snaps or pops, locking shaft 25 into place in the breather hole. An 0-ring 29 may be provided on shaft 25 for sealing engagement with hole 44.

Base 27 has a low-profile and includes a large central opening 22 in communication with central bore 18 of shaft 25. Base 27 includes a peripheral shoulder 23 for supporting membrane 30. This allows air to reach membrane 30 from bore 18 below. Membrane 30 is a thin sheet made of material which prevents outside contaminants such as oil, water and debris from entering the housing. Membrane 30 is held in place on shoulder 23 between base 27 and cover 33. Cover 33 includes a large open space above membrane 30, and ventilation holes 36 are provided in cover 33 to allow air to communicate with membrane 30 to or from the outside. Membrane 30 is sandwiched and suspended between support member 27 and cover 33 having breather holes 36 located thereon. An outwardly extending peripheral flange 31 is provided on the exterior of cover 33. Flange 31 is engaged with the peripheral edge of support 27, thereby sandwiching membrane 30 between cover 33, and support base 27 as shown in FIG. 2.

The preferred embodiment of the filter of the present invention is designed to be inserted into at least one of the unfiltered breather holes 44 found in many existing brake actuators to provide filtering. Accordingly, to the extent that filters of the present invention are not inserted into all of the breather holes 44 of the brake actuator housing 45, a plurality of plugs 51 are provided for closing up the remaining breather holes. Such a plug would be inserted into hole 44 shown in FIG. 5.

It is seen. that the cover 33, membrane 30, and support base 27 make up a common unit. Such unit should be (ultra-) sonically welded together, although any appropriate adhesive may also be used. The filter units of the present invention may be easily removed and replaced by new units by simply pulling the units out of the breather holes of the brake actuator. If difficulty is encountered, shaft 25 may be squeezed to allow compression along slot 21 similar to that used for original insertion.

In another embodiment, the edges of opening 22 of support base 27 may be provided with helical threads for threadable engagement with similar threads on the outside of the cover 33. In another embodiment, flange 20 is eliminated from shaft 25 and replaced with helical threads for threadable insertion into a breather hole of a brake actuator housing. In yet another embodiment, the hollow shaft is eliminated, and the support base 27 of the invention is provided with a wide opening. This opening is glued, sealed or otherwise adhered or attached directly over a breather hole 44 of the spring or service brake housing.

The filters of the present invention may be inserted into the breather holes 44 of a single-diaphragm stand alone service brake actuator (FIG. 5), to a single-diaphragm stand alone emergency brake actuator, or to a combined dual-diaphragm service and emergency brake actuator. Similarly, the filters of the present invention may be used on single-piston stand alone service brake actuators, single-piston stand alone emergency brake actuators, dual-piston combined service and emergency brake actuators, or combined piston & diaphragm service and emergency brake actuators.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. In a vehicle brake actuator having an upper and lower housing attached together and at least one air breather hole in at least one of said housings, the improvement wherein a filter is provided comprising a removable plug having a hollow interior made of a durable material for engagement with said at least one breather hole, said plug including an air breathable membrane extended across said interior, said membrane being made of material which prevents moisture and foreign material from entering said housing.

2. The improvement of claim 1 wherein said plug includes a low-profile support base having a large central opening therein, and a hollow shaft attached to said base for insertion into said at least one breather hole, said opening being in communication with said hollow shaft, the distal end of said shaft including an outwardly extending annular flange for removable engagement with said breather hole.

3. The improvement of claim 2 wherein said base includes a peripheral shoulder for supporting said membrane over said large central opening, and said plug includes a cover member having a plurality of openings therein for engagement with said base to form a sealed unit containing said membrane.

4. The improvement of claim 3 wherein said annular flange is tapered such that it is narrowest at the distal end of said shaft, and wider along said shaft forming an annular shoulder for locking engagement with said at least one breather hole.

5. The improvement of claim 4 wherein a slot is provided on the distal end of said shaft bisecting said annular flange.

6. The improvement of claim 5 wherein a plurality of plugs are provided for closing unused breather holes in said actuator housings.

7. The improvement of claim 6 wherein an O-ring is provided on said shaft between said annular shoulder and said base.

* * * * *